(12) United States Patent
Kirsch et al.

(10) Patent No.: US 9,003,863 B2
(45) Date of Patent: Apr. 14, 2015

(54) METHOD AND DEVICE FOR CORRECTING THE ACTUAL LIMIT VALUE OF A SENSOR

(75) Inventors: Andreas Kirsch, Stuttgart (DE); Christoph Biggel, Fellbach (DE)

(73) Assignee: Robert Bosch GmbH, Stuttgart (DE)

( * ) Notice: Subject to any disclaimer, the term of this patent is extended or adjusted under 35 U.S.C. 154(b) by 609 days.

(21) Appl. No.: 13/224,615

(22) Filed: Sep. 2, 2011

(65) Prior Publication Data
US 2012/0067106 A1 Mar. 22, 2012

(30) Foreign Application Priority Data

Sep. 6, 2010 (EP) .................................... 10175412

(51) Int. Cl.
*G01D 1/12* (2006.01)
*G01D 3/024* (2006.01)

(52) U.S. Cl.
CPC . *G01D 1/12* (2013.01); *G01D 3/024* (2013.01)

(58) Field of Classification Search
USPC ............... 73/1.79, 1.01–1.89; 702/86–88, 94, 702/101, 102, 104
See application file for complete search history.

(56) References Cited

U.S. PATENT DOCUMENTS

| 6,272,443 B1 * | 8/2001 | Motzko .......................... 702/143 |
| 6,421,589 B1 * | 7/2002 | Bederna et al. ............... 701/33.8 |
| 7,138,793 B1 | 11/2006 | Bailey |
| 8,055,456 B2 * | 11/2011 | Loher et al. ...................... 702/41 |
| 2003/0075891 A1 | 4/2003 | Stanec |
| 2009/0206829 A1 * | 8/2009 | Kamiya et al. ........... 324/207.25 |

* cited by examiner

*Primary Examiner* — Daniel S Larkin
*Assistant Examiner* — Irving A Campbell
(74) *Attorney, Agent, or Firm* — Kenyon & Kenyon LLP

(57) ABSTRACT

A controlling unit and a method of correcting an actual limit value of a sensor signal is described, wherein above or below the limit value a specific state of the sensor is recognized, the method including the steps of determining a new limit value of the sensor, determining a stability criteria to decide whether the actual limit value is corrected with said new limit value and approaching the actual limit value to the new limit value when the conditions are fulfilled to correct the actual limit value for said sensor.

24 Claims, 8 Drawing Sheets

METHOD AND DEVICE FOR CORRECTING THE ACTUAL LIMIT VALUE OF A SENSOR

CROSS REFERENCE TO RELATED APPLICATIONS

The present application claims the benefit under 35 U.S.C. §119 of European Patent Application No. EP 10175412.5 filed on Sep. 6, 2010, which is expressly incorporated herein by reference in its entirety.

FIELD OF THE INVENTION

The present invention relates to a technique of correcting the actual limit value of a sensor signal and in general is applicable to all kind of sensors.

BACKGROUND INFORMATION

Sensors have output signals which rise between a lowest signal value (e.g., 0V) and a highest signal value (e.g., 5V). Typically, a subset range between lowest and highest sensor signal value is used to measure the sensor position. The sub range is between a low limit value, which is greater than or equal to the lowest signal value, and an upper limit value, which is less than or equal to the highest signal value. For sensor signals greater than the upper limit value, a specific state is recognized, e.g., a full load of an accelerator pedal position. For sensor signals below the lower limit, a specific state is recognized, e.g., a low idle position of an accelerator pedal position. An accelerator pedal position sensor translates position into a voltage signal, which can be used by an engine control unit. Sensors have tolerances due to manufacturing processes. The tolerance represents a specific variation of the output signal of the sensor at upper and lower limit values. A specific state of the sensor is recognized above or below the limit value of the sensor signal. The limit value is different for different sensors. For example, tolerance specified by a manufacturer for an accelerator pedal position sensor for upper limit is 89%+/−3.9% at SV (4.255V to 4.645V). The limit value for sensor1 can be anywhere in this tolerance (85.1% to 92.9% at 5V) (from 4.255V to 4.645V). Assume an actual limit value for sensor1 is at 85.1% (Uppl1 4.255V). Similarly, an actual limit value for another sensor2 with the same tolerance could be at 89% (Uppl2 4.45V). Even though both of the sensors are from the same manufacturer, due to manufacturing processes, each sensor has different upper and lower limit values. The characteristic curve and the actual limits are shown for the sensor1 and sensor2 in FIG. 1. 101 represents a characteristic curve for sensor1 and 102 represents a characteristic curve for sensor2. In an application, each sensor can be calibrated to an actual limit value for upper or lower limit value to get good accuracy. But this actual limit value has to be measured individually for both upper and lower limit and calibrated. This process of measuring actual limit values individually is costly and not advantageous in an automotive application. Another solution of the problem is to compare both sensors and set the worst case of the limit values according to the upper limit of the tolerance range so that both sensors can reach the full load of the accelerator pedal. In this example, 4.255V (85.1% at 5V) could be the limit value. This value then can be set as the actual limit value for all accelerator pedal position sensors. The underlying problem is that the sensors lose output range (A) from lower limit value to the upper limit value. In this example, the second sensor output signal reaches the upper limit value at 4.255V instead of 4.45V. The following invention solves this specific problem and extends the usable output range of the sensor automatically irrespective of the manufacturer processes.

An object of the present invention is to correct the actual limit value and to extend the usable sensor range. The example method detects for each sensor a new limit value and self learns this new limit value and thus the actual limit value of the sensor is corrected.

SUMMARY

An example controlling unit 124 and an example method of correcting an actual limit value 70, 92 of a sensor signal are provided, wherein above or below the limit value a specific state of the sensor is recognized. The example method comprises the steps of determining a new limit value of the sensor 66,87, determining a stability criteria 50 to decide whether the actual limit value 70,92 is corrected with said new limit value 66, 87 and approaching the actual limit value 70,92 to the new limit value 66,87 when the conditions are fulfilled to correct the actual limit value 70,92 for said sensor.

The example embodiment of the present invention provides a technique to correct the actual limit value of a sensor. The technique automatically detects a new limit value for each sensor and self learn this new limit value and thus the actual limit value of the sensor is corrected irrespective of the manufacturing processes and advantageously the technique compensates for aging of the sensor.

Another advantage of the present invention is that each sensor is treated individually and the appropriate values are determined for the limit value. The limit value of the sensor is corrected by which its working range is increased.

DETAILED DESCRIPTIONS

The present invention is described herein for an accelerator pedal position sensor. However, the present invention can also be applied to other types of sensors.

Figure 1:
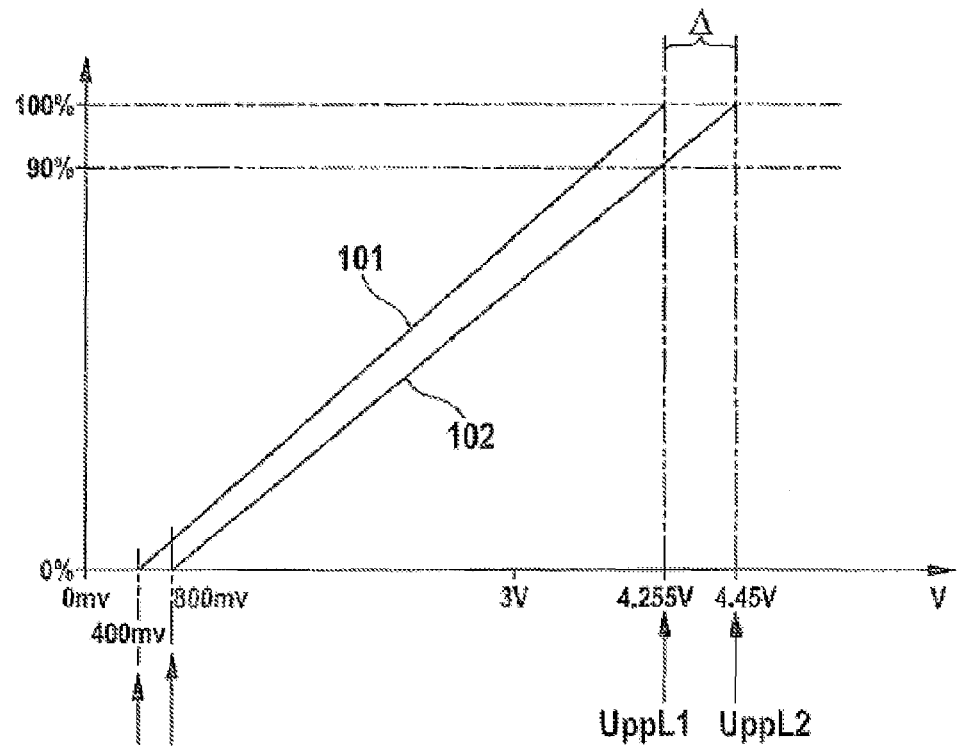
FIG. 1 shows a graphical representation of the position of the accelerator pedal versus accelerator pedal signal output voltage.
Figure 2:
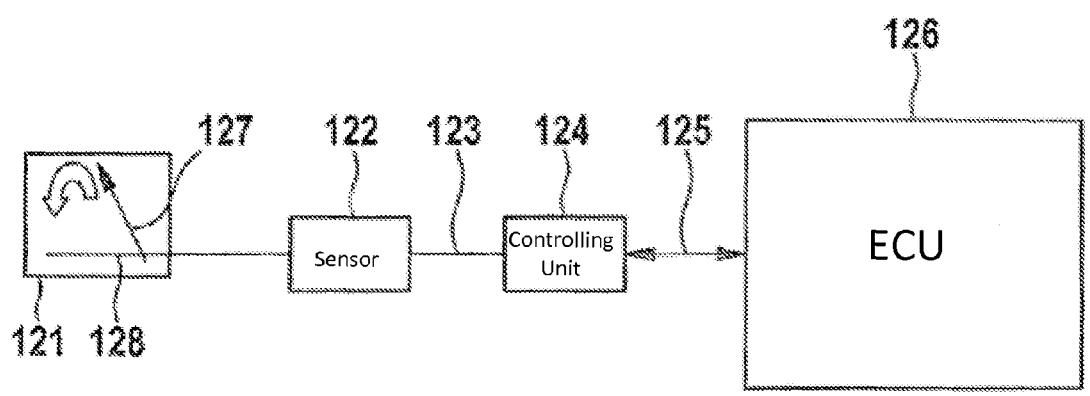
FIG. 2 shows a block diagram of ECU with sensor for correcting the new limit value.

FIG. 2 shows a connection of an ECU 126 with a sensor 122. An accelerator pedal position sensor 122 is connected to an accelerator pedal 121. The accelerator pedal 121 has a mechanically moving part 127. The accelerator pedal position sensor 122 converts the accelerator pedal movement and position into the actual sensor values 123. The actual sensor values 123 of accelerator pedal position sensor 122 are measured by a controlling unit 124. From these actual sensor values 123, the controlling unit 124 is able to determine the position of an accelerator pedal 121.

The controlling unit 124 comprises an arrangement for determining a new limit value of the sensor, an arrangement for determining a stability criteria 50 to decide whether an actual limit value is corrected with the new limit value, and an arrangement for approaching the actual limit value to the new limit value when the conditions are fulfilled to correct the actual limit value for the sensor.

This controlling unit 124 can be either part of the ECU 126 or outside the ECU 126. The output 125 of controlling unit 124 is connected to ECU 126. The controlling unit 124 interacts with the ECU 126 to take appropriate decisions like increase of engine torque, etc.

Figure 3:
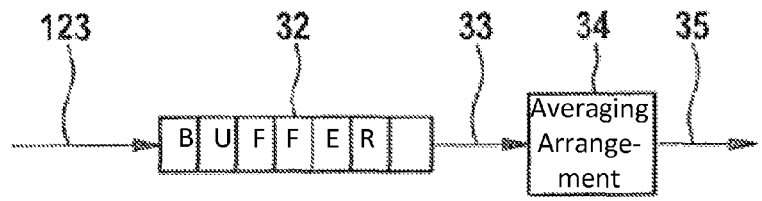
FIG. 3 shows a block diagram for determining an average limit value of the sensor.

FIG. 3 illustrates a part of the controlling unit 124. As shown in FIG. 3, the controlling unit 124 further comprises a ring buffer 32 and an arrangement for determining an average value 34 to calculate an average limit value 35. The controlling unit 124 time-wisely measures the actual sensor values 123 of accelerator pedal position sensor 122 and stores these actual sensor values 123 into the ring buffer 32. Typically, the controlling unit 124 measures sensor values in 10 to 20 ms time cycles. The ring buffer 32 is set to uneven size for an improved accuracy of the average value. Typically, the size of the ring buffer 32 is set to 5 or 7. The stored sensor values 33 are then averaged in averaging arrangement 34 to get the average limit value 35 of the sensor.

The controlling unit 124 comprises further an arrangement for determining a stability criteria 50.

Figure 4:
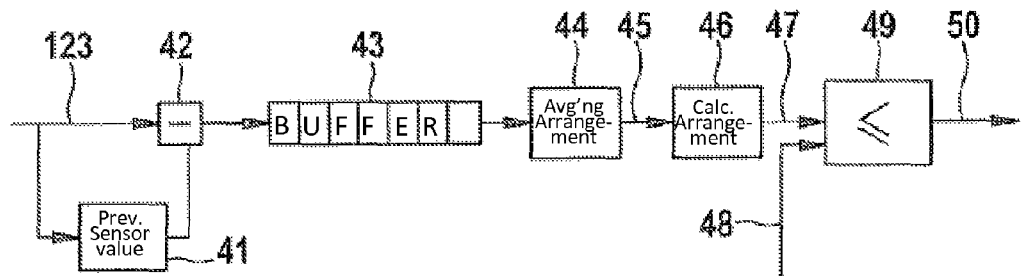
FIG. 4 shows a block diagram for determining the stability criteria.

FIG. 4 illustrates an arrangement for determining the stability criteria 50. The controlling unit 124 time-wisely measures the actual sensor values 123 of accelerator pedal position sensor 122. The difference 42 of an actual sensor value 123 and a previous sensor value 41 is stored in a ring buffer 43. Typically, the controlling unit 124 measures sensor values in 10 to 20 ms time cycle. The ring buffer 43 is set to uneven size for an improved accuracy of the average value. Typically, the size of the ring buffer 43 is set to 5 or 7. The stored difference values 43 are then averaged in averaging arrangement 44 to get the average difference value 45. The absolute difference of the sensor value 47 is determined over this average difference value 45 by absolute value calculating arrangement 46. The absolute difference of the sensor value 47 is compared by comparing arrangement 49 with a predetermined stability threshold value 48 to set or unset the stability criteria 50.

The stability criteria 50 is set (TRUE) when the absolute difference of the sensor value 47 is smaller than the predetermined stability threshold value 48 or otherwise unset (FALSE). Typically, the value of the predetermined threshold value is below 100 mV.

Figure 5:
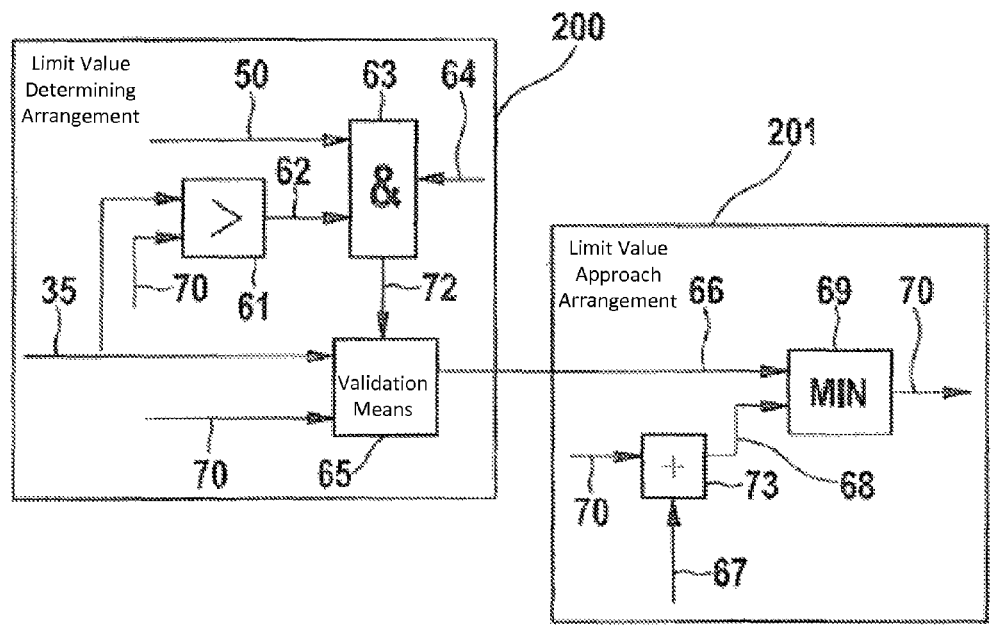
FIG. 5 shows a block diagram for determining the new limit value of the sensor and approaching the actual limit value to the new limit value with a predetermined threshold limit value.

FIG. 5 illustrates part of controlling unit 124. As shown in FIG. 5, the controlling unit further comprises arrangement 200 for determining a new limit value 66 of the sensor and arrangement 201 for approaching the actual limit value 70 to the new limit value 66. As shown in FIG. 5, the average limit value 35 and actual limit value 70 are compared by comparing arrangement 61. The output 62 of comparing arrangement 61, the stability criteria 50 and the other conditions 64 are logically AND connected by the logical-and-operation arrangement 63 to generate a valid condition 72 for taking an appropriate decision whether to set new limit value 66 to the average limit value 35. Logical-and-operation arrangement 63 generates the valid condition 72 only if the stability criteria 50, the output 62 and other conditions 64 are TRUE. The output 62 of comparing arrangement 61 is true when the average limit value 35 is greater than the actual limit value 70. The other conditions 64 might be working condition of a sensor, failure conditions, etc. The new limit value 66 is set to average limit value 35 by validation means 65 only if the valid condition 72 is satisfied.

As shown in FIG. 5, the controlling unit comprises an arrangement 201 for approaching the actual limit value 70 to the new limit value 66. The predetermined threshold limit value 67 is added by adding arrangement 73 to the actual limit value 70. A typical value for the predetermined threshold limit value is 50 mV. The sum 68 of actual limit value 70 and predetermined threshold value is compared with new limit value 66 by minimum operation arrangement 69. The actual limit value 70 will be corrected to a new limit value 66 if the sum of the actual limit value 70 and predetermined threshold limit value 67 is smaller than the new limit value 66. Thus, the actual limit value 70 approaches to the new limit value 66 in steps of predetermined threshold limit value 67.

Figure 6:
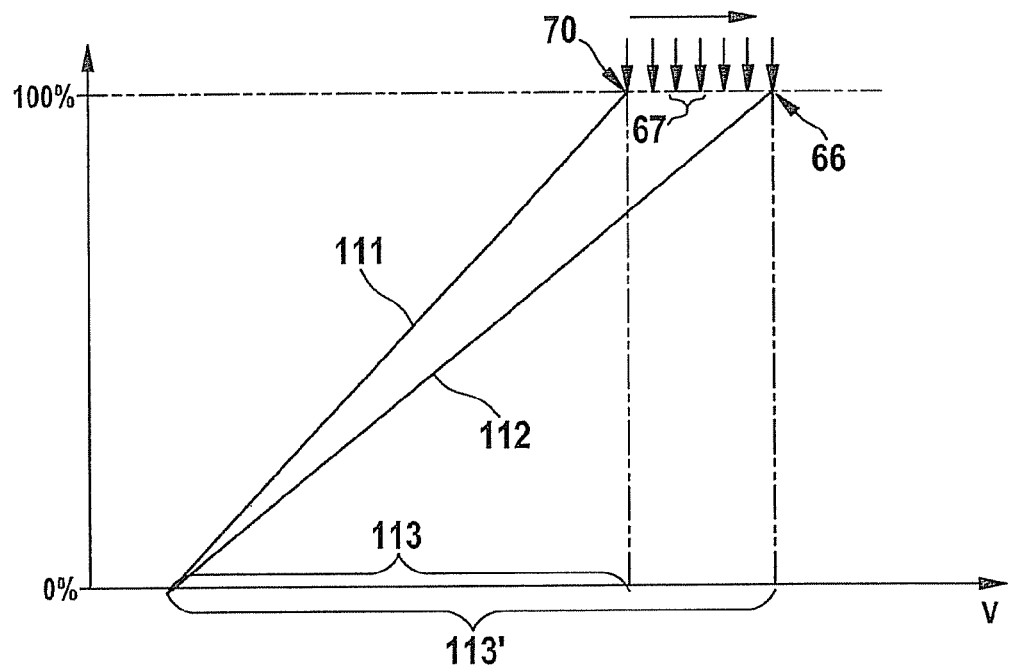
FIG. 6 shows a graphical representation of correcting the actual limit value to the new limit value.

FIG. 6 illustrates the graphical representation of approaching the actual limit value 70 to the new limit value 66 for the upper limit value of the sensor. New limit value 66 is determined by arrangement 200 as explained in the FIG. 5. The actual limit value 70 is corrected to a new limit value 66 if the sum of the actual limit value 70 and predetermined threshold limit value 67 is smaller than the new limit value 66. Thus, the actual limit value 70 approaches to the new limit value 66 in steps of predetermined threshold limit value 67. The new characteristic curve 112 is shown which indicates an approaching the actual limit 70 to the new limit value 66. This way, a sensor working range 113 is increased to 113'.

Due to aging and/or usage of the sensor, output signal slowly changes independent of the measured property, this is defined as drift. For example, due to aging and/or usage, for the above limit value, the sensor signal shifts in signal level and thereby the actual limit value 70 is not reached any more. This shift or drift results may result in a wrong sensor result. Thus, it would be highly desirable to provide an improved apparatus that has the capability to correct the drift automatically.

Figure 7:
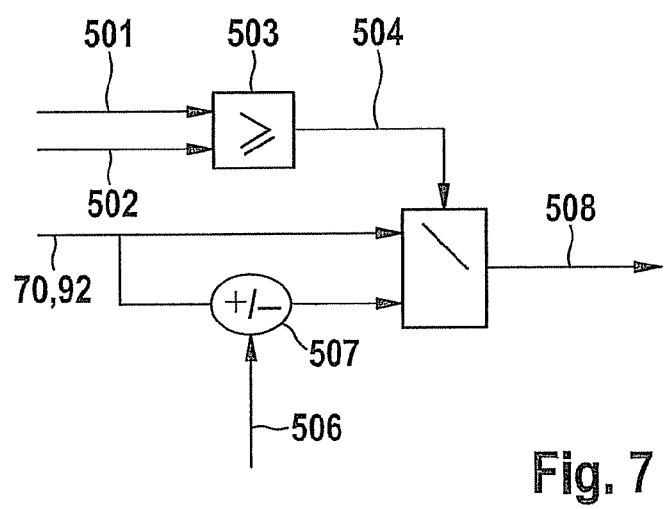
FIG. 7 shows a block diagram for correcting actual limit value due to aging of the sensor.

FIG. 7 illustrates part of controlling unit 124 for correcting an actual limit value 70, 92 to a new actual limit value 508 due to drift. The controlling unit 124 has a cycle counter 501, which increments for every "Switch ON of the controlling unit 124 of the sensor." The cycle counter 501 is used to determine the "age" of the sensor. Initially, the value will be set to ZERO and once the cycle counter 501 value reaches a configured maximum cycle count 502, the cycle counter will be reset to ZERO. For simplicity, the drift correction is explained only for upper limit of the sensor. As shown in the FIG. 7, the actual limit value 70, 92 of a sensor is corrected to a new actual limit value 508 with predefined offset correction factor 506.

For the above limit value, the actual limit value 70 is decreased ("−") 507 by predefined offset correction factor 506 if the cycle counter 501 value reaches a configured maximum cycle count 502. The cycle counter 501 is also reset to ZERO if the actual sensor values 123 are greater than the actual limit value 70.

Figure 8:
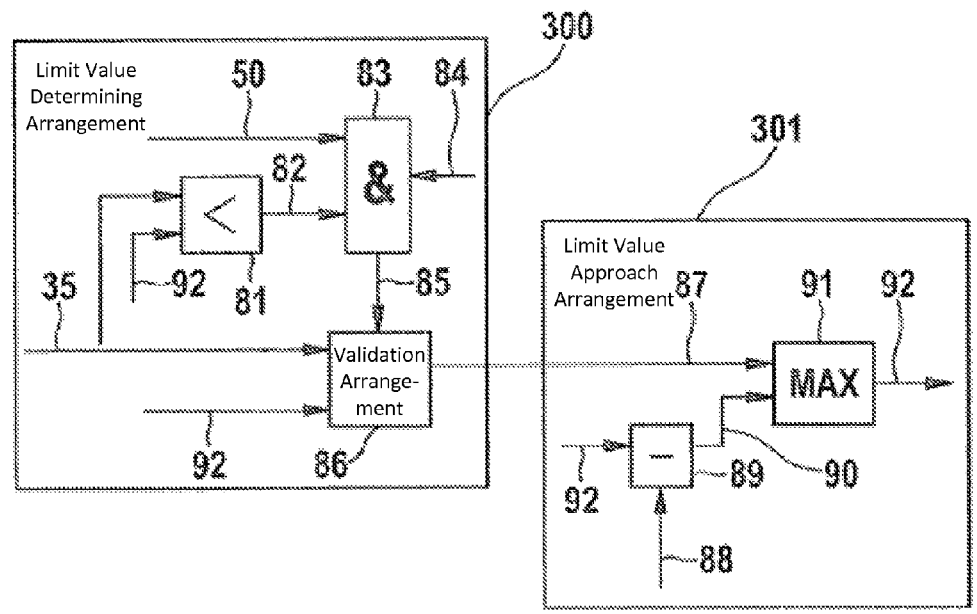
FIG. 8 shows a block diagram for determining the new limit value of the sensor for a below limit value and approaching the actual limit value to the new limit value with a predetermined threshold limit value for the below limit value of the sensor.
Figure 9:
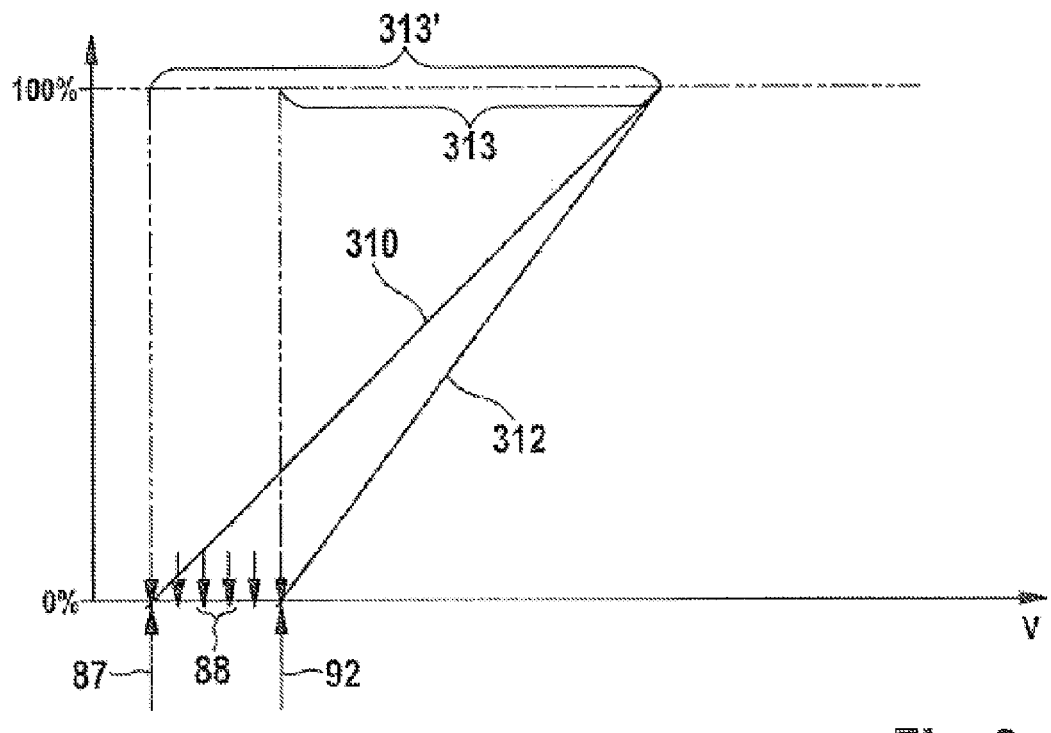
FIG. 9 shows a graphical representation of correcting actual limit value to a new limit value for the lower limit value of the sensor.

FIG. 8 and FIG. 9 illustrate the correction for the lower limit value of the sensor, determining the new limit value of the sensor and correcting an actual limit value to the new limit value.

FIG. 8 illustrates part of controlling unit 124. As shown in FIG. 8, the controlling unit further comprises arrangement 300 for determining a new limit value 87 of the sensor and arrangement 301 for approaching the actual limit value 92 to the new limit value 87. As shown in FIG. 8, the average limit value 35 and actual limit value 92 are compared by comparing arrangement 81. The stability criteria 50, the output 82 of comparing arrangement 81, and other conditions 84 are logically ANDed by the logical-and-operation arrangement 83 to generate a valid condition 85 for taking appropriate decision whether to set new limit value 87 to the average limit value 35. Logical-and-operation arrangement 83 generates the valid condition 85 only if the stability criteria 50, the output 82 and other conditions 84 are TRUE. The output 82 of comparing arrangement 81 is true when the average limit value 35 is less than the actual limit value 92. The other conditions might be working condition of a sensor, failure conditions, etc. The new limit value 87 is set to average limit value 35 by validation arrangement 86 only if the valid condition 85 is satisfied.

As shown in FIG. 8, the controlling unit comprises an arrangement 301 for approaching the actual limit value 92 to the new limit value 87. The predetermined threshold limit value 88 is substracted from the average limit value 92 by substractor arrangement 89. A typical value for the predetermined threshold limit value is 50 mV. The difference value 90 of actual limit value 92 and predetermined threshold value 88 is compared with new limit value 87 by maximum operation means 91. The actual limit value 92 is corrected to a new limit value 87 if the difference of the actual limit value 92 and predetermined threshold limit value 88 is larger than the new limit value 87. Thus, the actual limit value 92 approaches to the new limit value 87 in steps of predetermined threshold limit value 88.

FIG. 9 illustrates the graphical representation of approaching the actual limit value 92 to the new limit value 87 for the lower limit value of the sensor. New limit value 87 is determined by arrangement 300 as explained in the FIG. 8. The actual limit value 92 is corrected to the new limit value 87 if the difference between the actual limit value 92 and predetermined threshold limit value 88 is larger than the new limit value 87. Thus, the actual limit value 92 approaches to the new limit value 87 in steps of predetermined threshold limit value 88. The new characteristic curve 310 is shown, which indicates an approaching of the actual limit 92 to the new limit value 87. This way, a sensor working range 313 is increased to 313' and thus more accuracy and measurements are possible.

As shown in the FIG. 7, the actual limit value 92 is increased ("+") 507 by predefined offset correction factor 506 if the cycle counter 501 value reaches a configured maximum cycle count 502. The cycle counter 501 is also reset to ZERO if the actual sensor values 123 are smaller than the actual limit value 92.

Figure 10:
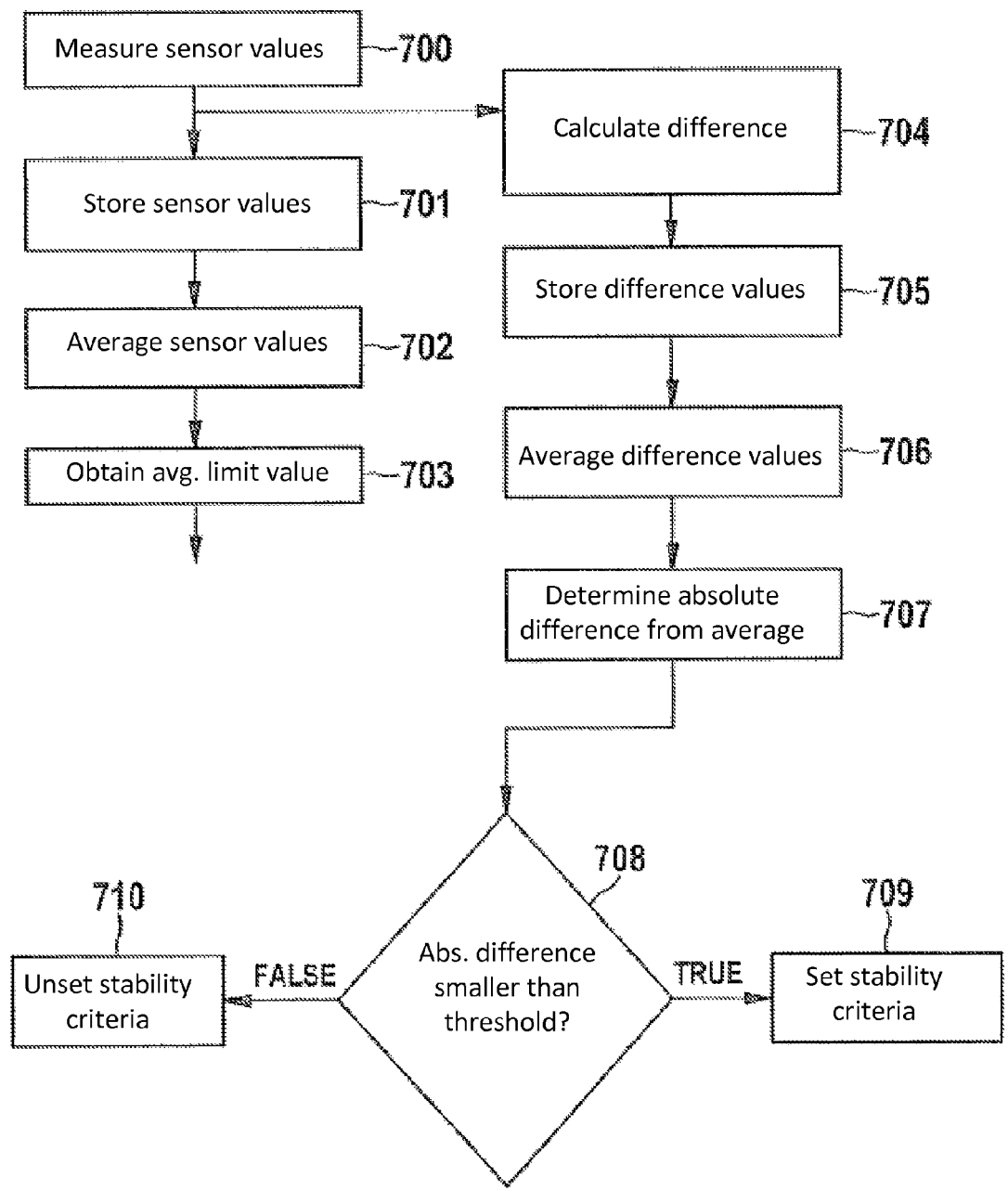
FIG. 10 shows a flow chart for determining average limit value and stability criteria.

FIG. 10 illustrates processing steps associated with FIG. 3 and FIG. 4 for accelerator pedal position sensor 122. At 700, the controlling unit 124 time-wisely measures the actual sensor values 123 of accelerator pedal position sensor 122. At 701, the actual sensor values 123 are stored in the ring buffer 32. At 702, the stored sensor values 33 are averaged by averaging arrangement 34 to get the average limit value 35 of the sensor at 703.

FIG. 10 further illustrates processing steps for determining the stability criteria 50. At 704, the difference 42 between the actual sensor value 123 and the previous sensor value 41 is calculated and stored in a ring buffer 43 at 705. At 706, the stored difference values 43 are then averaged in averaging arrangement 44 to get the average difference value 45. At 707, the absolute difference of the sensor value 47 is determined over this average difference value 45 by absolute value calculating arrangement 46. The absolute difference of the sensor value 47 is compared by comparing arrangement 49 with a predetermined stability threshold value 48 to set or unset the stability criteria 50. The stability criteria 50 is set when the absolute difference of the sensor value 47 is smaller than the predetermined stability threshold value 48 or otherwise unset.

Figure 11:
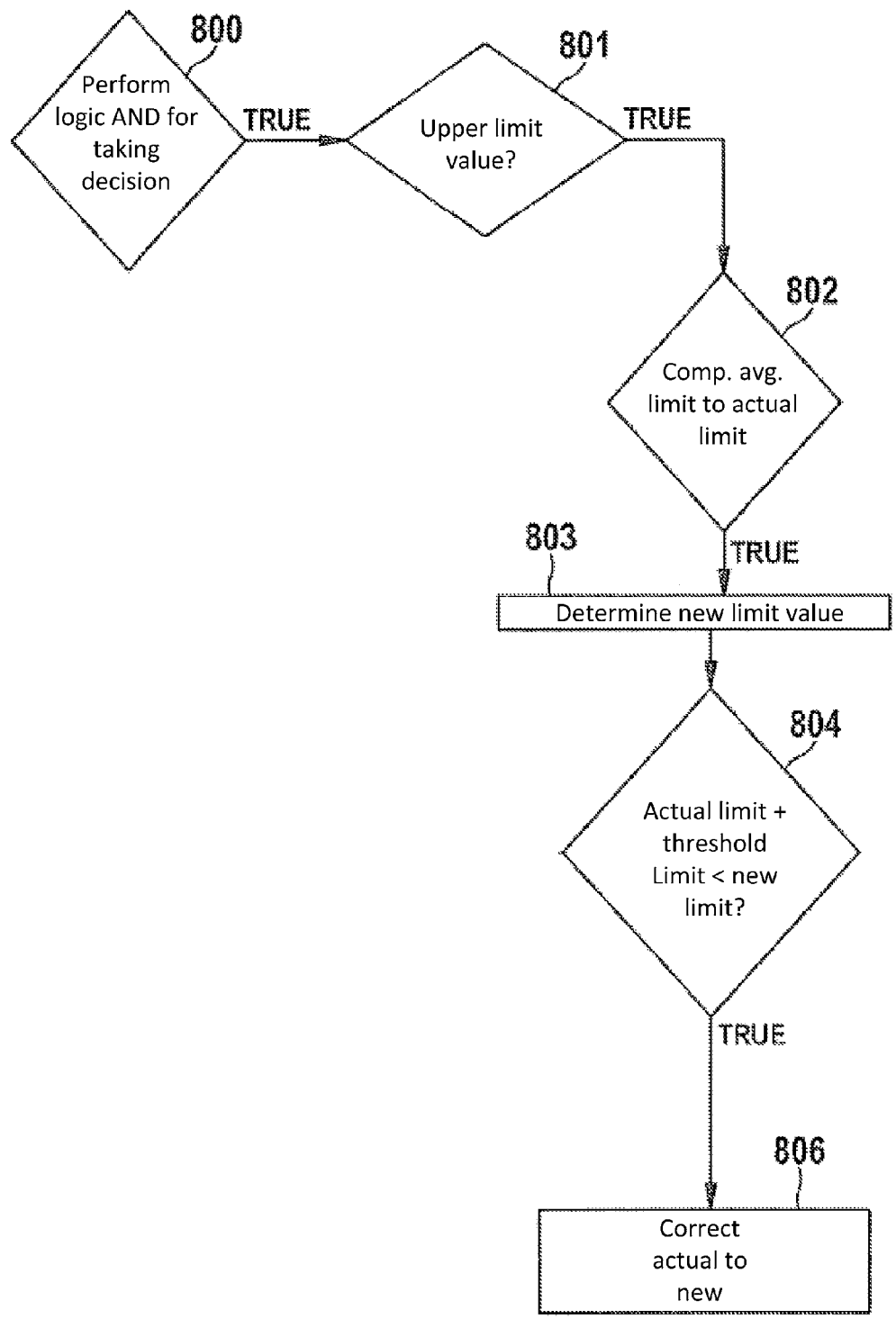
FIG. 11 shows a flow chart for approaching actual limit value to the new limit value.

FIG. 11 illustrates processing steps for determining new limit value and approaching the actual limit value to the new limit value for the upper limit value for simplicity, but similar steps are also performed for the lower limit value. At 800, the stability criteria 50 and other conditions 64 are logically AND connected by the logical-and-operation means 63 to generate valid condition 72 for taking appropriate decision. At 801, the check is done to know whether the decision is for upper limit value or not. At 802, average limit value 35 is compared with the actual limit value 70. At 803, new limit value 66 is determined if the output 62 of comparing arrangement 61 is true. The new limit value is set to the average limit value 35 if the average limit value 35 is greater than the actual limit value 70. At 804, the sum 68 of actual limit value 70 and predetermined threshold value is compared with new limit value 66 by minimum operation arrangement 69. At 806, the actual limit value 70 will be corrected to a new limit value 66 if the sum of the actual limit value 70 and predetermined threshold limit value 67 is smaller than the new limit value 66. Thus, the actual limit value 70 approaches to the new limit value 66 in steps of predetermined threshold limit value 67.

Figure 12:
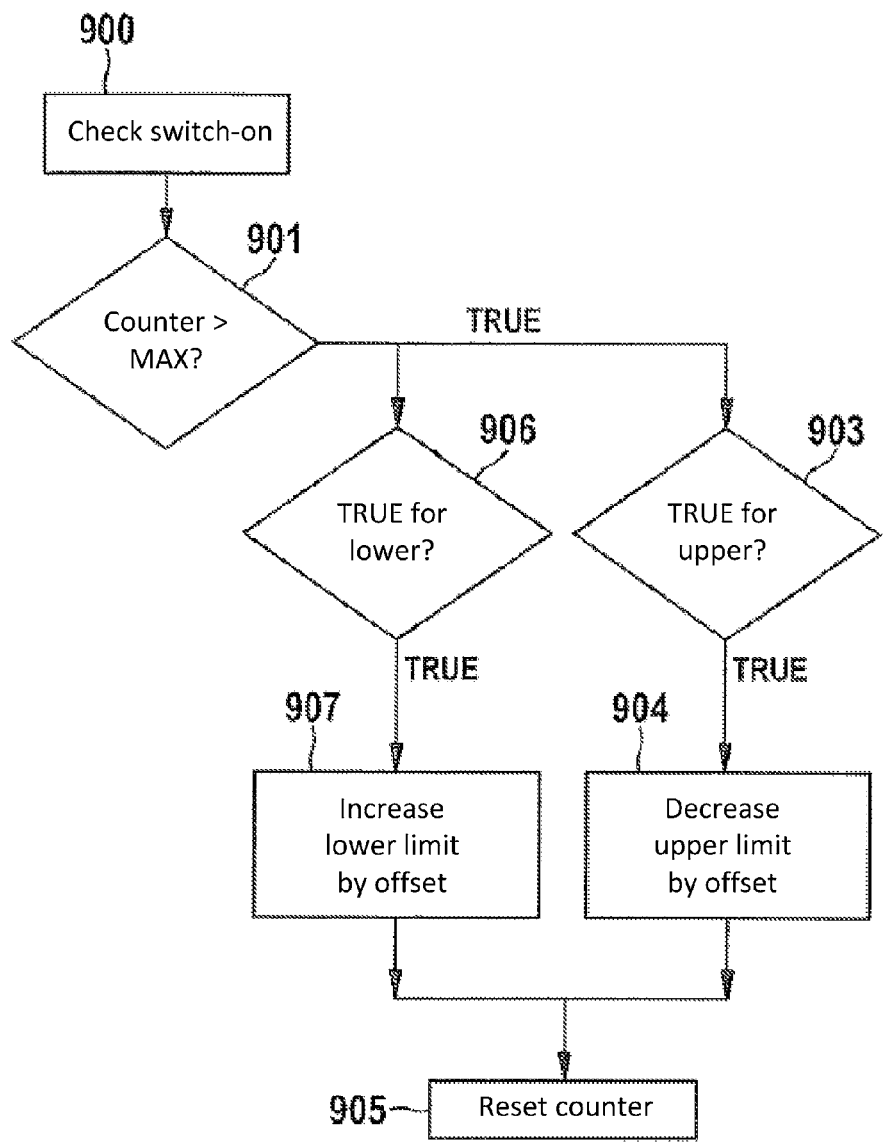
FIG. 12 shows a flow chart for correcting the actual limit value of a sensor due to drift.

FIG. 12 explains correcting actual limit value due to drift. The controlling unit 124 has a cycle counter 501. Initially, the value of this counter is set to ZERO and is incremented for every "Switch ON of the controlling unit 124 of the sensor." The cycle counter 501 is used to determine the "age" of the sensor. At 900, "controlling unit 124 Switch ON" is checked. At 901, the cycle counter 501 is compared with maximum cycle count 502. If the cycle counter 501 is greater than the maximum cycle count 502, further checks at 903 and 906 are done to know whether the decision for the upper limit value of the sensor or lower limit value of the sensor. At 901, the cycle counter 501 is incremented, if the cycle counter 501 is smaller than the maximum cycle count 502.

At 904, if the decision is TRUE for the upper limit value of the sensor, the actual limit 70 of a sensor is corrected with predefined offset correction factor 506. At 904, the actual limit value 70 is decreased ("−") by predefined offset correction factor 506. At 905, the cycle counter 501 is reset to ZERO if the cycle counter 501 value reaches configured maximum cycle count 502.

At 907, for the lower limit value of the sensor, the actual limit value 92 is increased ("+") by the predefined offset correction factor 506 if the cycle counter 501 501 value reaches configured maximum cycle count 502.

Figure 13:
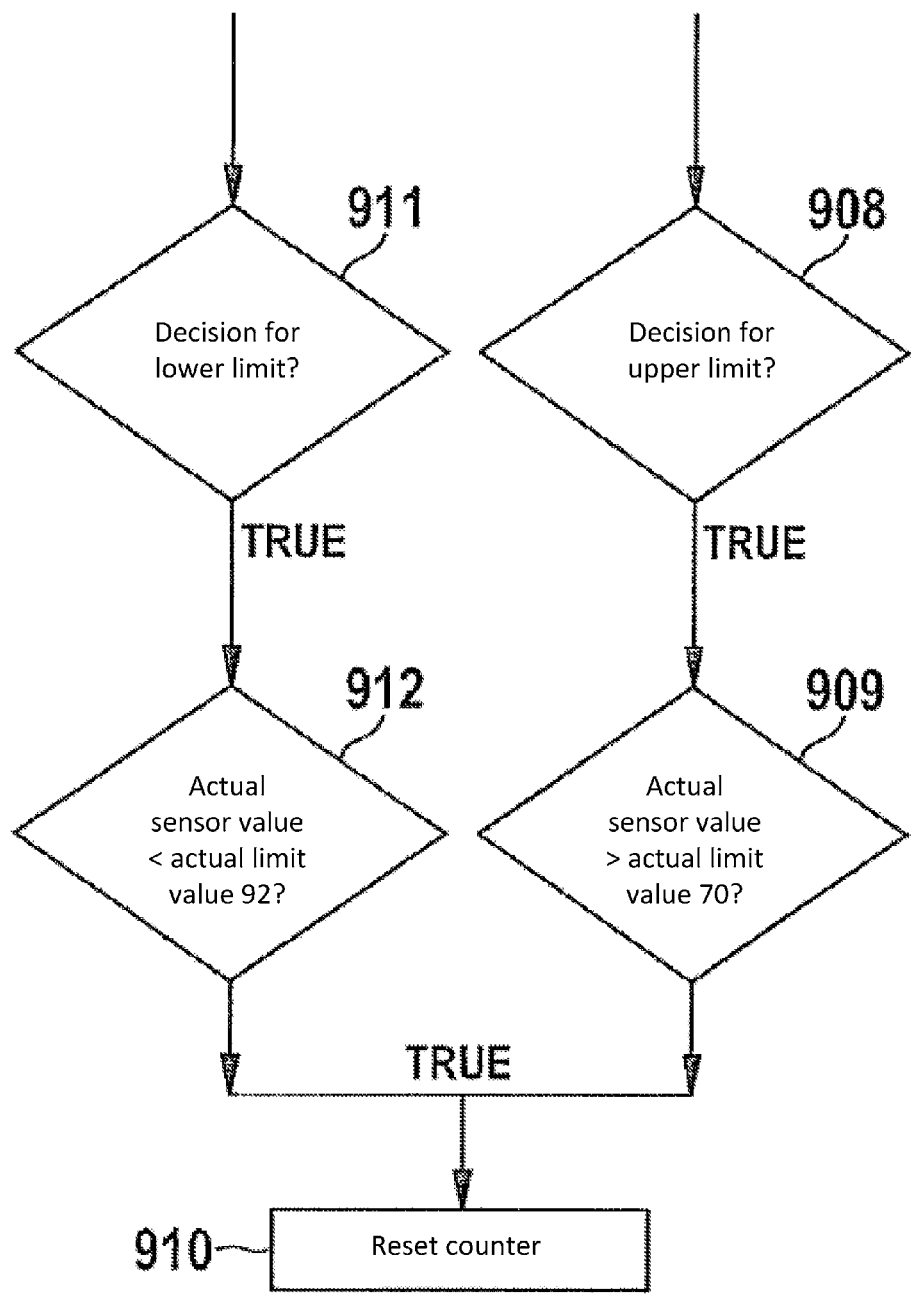
FIG. 13 is a flowchart that illustrates a method for checking upper and lower limit value of the sensor, according to an example embodiment of the present invention.

As shown in FIG. 13, at 908, a check is done to know the decision for the upper limit value of the sensor. If the decision is TRUE, at 909, a check is done to determine whether the actual sensor value 123 is greater than the actual limit value 70. At 910, the cycle counter 501 is reset to ZERO if the actual sensor values 123 are greater than the actual limit value 70.

At 911, a check is done to know the decision for the lower limit value of the sensor. If the decision is true, at 912, a check is done to determine whether the actual sensor value 123 is smaller than the actual limit value 92. At 910, the cycle counter 501 is reset to ZERO if the actual sensor values 123 are smaller than the actual limit value 92.

The invention claimed is:

1. A method of correcting an actual limit value of a sensor signal, wherein above or below the limit value a specific state of the sensor is recognized, the method comprising:
    determining a new limit value of the sensor;
    determining a stability criteria;
    deciding, based on the stability criteria, whether the actual limit value is corrected with the new limit value; and
    iteratively modifying the actual limit value to approach the new limit value responsive to a result of the deciding being that the actual limit value for the sensor is to be corrected with the new limit value.

2. The method according to claim 1, wherein above the limit value of the sensor signal a specific state of the sensor is recognized, and wherein the new limit value of the sensor is determined by measuring and storing timewisely actual sensor values in a buffer, determining an average limit value by averaging the stored actual sensor values in the buffer, and setting the new limit value to the average limit value of the sensor if said average limit value of the sensor is greater than the actual limit value.

3. The method according to claim 2, wherein the buffer is a ring buffer.

4. The method according to claim 2, wherein approaching the actual limit value to the new limit value comprises the step of:
    adding a predetermined threshold limit value to the actual limit value when a sum of the actual limit value and the predetermined threshold limit value is smaller than the new limit value.

5. The method according to claim 1, wherein below the limit value of the sensor signal a specific state of the sensor is recognized, and wherein the new limit value of the sensor is determined by measuring and storing timewisely actual sensor values in a buffer, determining an average limit value by averaging said stored actual sensor values in said buffer; and setting the new limit value to the average limit value of the sensor if the average limit value of the sensor is smaller than the actual limit value.

6. The method according to claim 5, wherein the buffer is a ring buffer.

7. The method according to claim 5, wherein approaching the actual limit value to the new limit value comprises the step of:
    subtracting a predetermined threshold limit value from the actual limit value when a difference of the actual limit value and predetermined threshold limit value is greater than the new limit value.

8. The method according to claim 1, wherein determining the stability criteria comprises the steps of:
    measuring an actual sensor value;
    calculating a difference between the actual sensor value and a previous actual sensor value;
    storing the difference of said sensor values in a buffer;
    calculating an average difference value of the stored difference values;
    determining an absolute difference of the sensor value;
    comparing the absolute difference of the sensor value with a predetermined stability threshold value; and
    one of setting and unsetting one of the stability criteria when the absolute difference of the sensor value is smaller than the predetermined stability threshold value.

9. The method according to claim 8, wherein the buffer is a ring buffer.

10. The method according to claim 1, wherein above the limit value of the sensor signal a specific state of the sensor is recognized, and the method further comprises the steps of:
    determining a cycle counter for counting a Switch ON of a controlling unit of the sensor; and
    reducing the actual limit value by a predetermined offset value when the cycle counter reaches a maximum cycle count limit.

11. The method according to claim 10, wherein the cycle counter is reset to zero when the average limit value of the sensor is greater than the actual limit value.

12. The method according to claim 1, wherein below the limit value of the sensor signal a specific state of the sensor is recognized, and the method further comprises the steps of:
    determining a cycle counter for counting a Switch ON of a controlling unit of the sensor; and
    increasing the actual limit value by a predetermined offset value when the cycle counter reaches a maximum cycle count limit.

13. The method according to claim 12, wherein the cycle counter is reset to zero, when the average limit value of the sensor is smaller than the actual limit value.

14. The method according to claim 1, wherein determining the stability criteria includes determining whether values of the sensor signal over a time period indicate more than a predetermined amount of jitter, in which case the sensor signal is determined to be unstable and the conditions to correct the actual limit value are unfulfilled.

15. A controlling unit for a sensor, wherein the controlling unit recognizes a specific state of the sensor if the sensor signal is above or below a limit value, the controlling unit comprising:
    an arrangement to determine a new limit value of the sensor;
    an arrangement to determine a stability criteria to decide whether the actual limit value is corrected with the new limit value; and
    an arrangement configured to iteratively modify the actual limit value to approach the new limit value responsive to the decision being that the actual limit value for the sensor is to be corrected with the new limit value.

16. A method for correcting a limit value of a sensor signal, comprising:
    determining, by processing circuitry, whether the sensor signal has been stable over a time period;
    while the limit value of the sensor signal is set to a current limit value, determining, by the processing circuitry, a new limit value for the sensor signal; and
    gradually modifying, by the processing circuitry, the limit value of the sensor signal from the current limit value in increments towards the new limit value, wherein the gradual modification is performed conditionally upon the sensor signal being determined to have been stable over the time period.

17. The method according to claim 16, wherein changes over time in the sensor signal up to the limit value cause changes in performance of a mechanical operation, the limit value defining a point beyond which changes over time in the sensor signal do not cause any corresponding changes in the performance of the mechanical operation.

18. The method according to claim 16, wherein the determination of whether the sensor signal has been stable over time includes periodically sampling the sensor signal, comparing the values of each pair of consecutive ones of the samples over the time period, and determining whether a representative value of the collection of differences determined by the comparisons is greater than or equal to a predetermined threshold, wherein the sensor signal is determined to be unstable in response to the representative value being determined to be greater than or equal to the predetermined threshold.

19. The method according to claim 16, wherein the limit value is an upper limit value, and the method further comprises determining whether the new limit value is greater than the current limit value, the gradual modification being performed conditionally upon the new limit value being determined to be greater than the current limit value.

20. The method according to claim 19, further comprising determining an average limit value of a plurality of values of the sensor signal over time, wherein the average limit value is used as the new limit value.

21. The method according to claim 16, wherein the limit value is a lower limit value, and the method further comprises determining whether the new limit value is less than the current limit value, the gradual modification being performed conditionally upon the new limit value being determined to be lower than the current limit value.

22. The method according to claim 21, further comprising determining an average limit value of a plurality of values of the sensor signal over time, wherein the average limit value is used as the new limit value.

23. The method according to claim 16, wherein the gradual modification includes iteratively adding a predetermined value to the limit value until further addition of the predetermined value would increase the limit value to greater than the new limit value, in which case the further addition is not performed.

24. The method according to claim 16, wherein the gradual modification includes iteratively subtracting a predetermined value from the limit value until further subtraction of the predetermined value would decrease the limit value to less than the new limit value, in which case the further subtraction is not performed.

* * * * *